United States Patent [19]

Abe et al.

[11] 4,306,043

[45] Dec. 15, 1981

[54] PROCESS FOR PRODUCING THERMOPLASTIC RESINS

[75] Inventors: Mitsuo Abe, Yokkaichi; Masamichi Iwama, Yokohama; Syuji Tsuchikawa; Takao Morikawa, both of Yokkaichi, all of Japan

[73] Assignee: Japan Synthetic Rubber Co., Ltd., Tokyo, Japan

[21] Appl. No.: 140,834

[22] Filed: Apr. 16, 1980

[30] Foreign Application Priority Data

Apr. 28, 1979 [JP] Japan .................................. 54/52022
Mar. 11, 1980 [JP] Japan .................................. 55/29814

[51] Int. Cl.³ ...................... C08F 2/22; C08F 212/12
[52] U.S. Cl. ........................................ 526/80; 526/87; 526/329.2
[58] Field of Search ................... 526/329.2, 80, 87

[56] References Cited

U.S. PATENT DOCUMENTS

| 2,851,447 | 9/1958 | Wesp et al. | 260/80.5 |
| 3,010,936 | 11/1961 | Irvin | 260/45.5 |
| 4,001,484 | 1/1977 | Song | 526/329.2 |
| 4,025,581 | 5/1977 | Powell et al. | 526/329.2 |

FOREIGN PATENT DOCUMENTS 40-9856  5/1965 Japan .
45-33661 10/1970 Japan .

*Primary Examiner*—Stanford M. Levin
*Attorney, Agent, or Firm*—Oblon, Fisher, Spivak, McClelland & Maier

[57] ABSTRACT

A process for producing a resin having a high heat resistance with a high polymerization conversion by emulsion-polymerizing α-methylstyrene (AMS), methyl methacrylate (MMA) and acrylonitrile (AN), characterized in that the polymerization is conducted in two steps; A monomer mixture consisting of 60–85% by weight of AMS, 2–30% by weight of MMA and 5–20% by weight of AN is subjected to copolymerization in the first step until 25–85% by weight, based on the weight of the final copolymer, of a copolymer is formed, and in the second step, at least one monomer of the above three monomers is added to the polymerization system to adjust the composition ratio of the three monomers in the polymerization system so as to fall in the region surrounded by the lines connecting points A, B, C, D and E in the triangular coordinate graph indicating the quantitative relationship of the three monomers, and the resulting monomer mixture is subjected to polymerization conditions to complete the polymerization.

14 Claims, 1 Drawing Figure

METHYL METHACRYLATE (wt%)

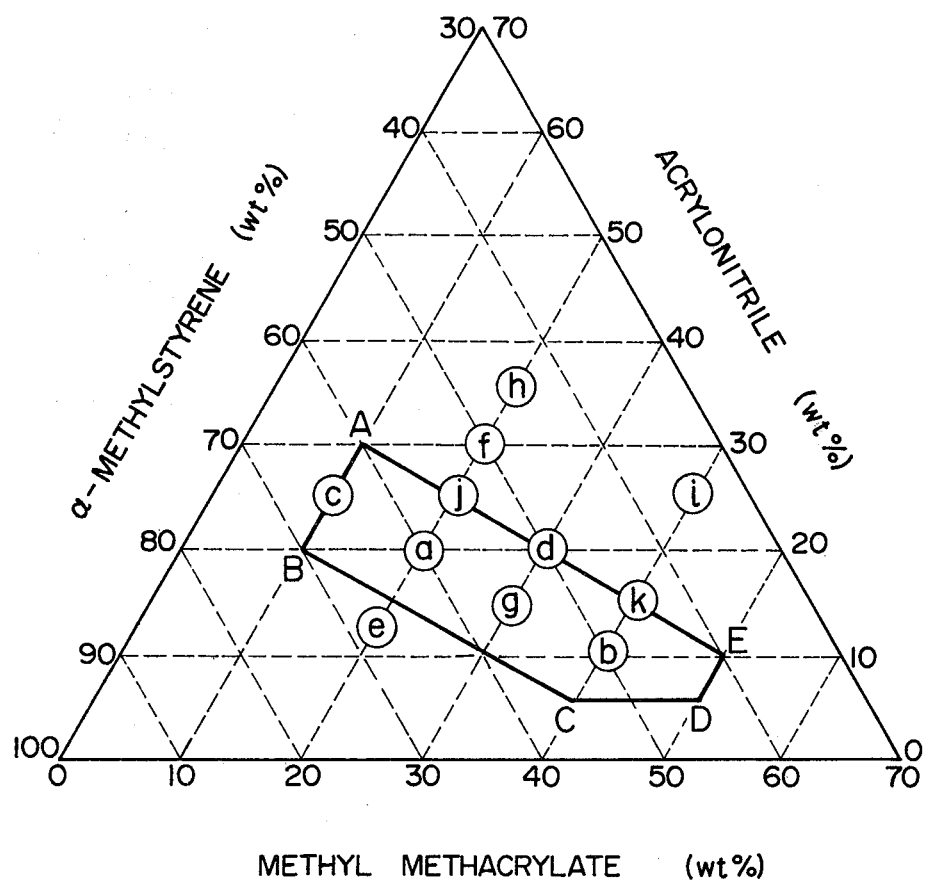

PROCESS FOR PRODUCING THERMOPLASTIC RESINS

This invention relates to a novel process for producing in a high yield a thermoplastic terpolymer resin composed of α-methylstyrene, methyl methacrylate and acrylonitrile and having a high heat resistance.

Since polystyrene or styrene-containing copolymers have relatively low heat distortion temperature (softening point), there have hitherto been made various proposals to enhance the heat distortion temperature by replacing the styrene with α-methylstyrene. For example, in Japanese Pat. No. 18,194/60, a composition of an α-methylstyrene-acrylonitrile copolymer and a graftcopolymer of acrylonitrile and styrene on a rubber (ABS resin) is disclosed. However, this composition is deformed greatly at a temperature of about 110° C., so that it cannot be said to have a sufficient heat resistance in practice. This is because if α-methylstyrene and acrylonitrile are subjected to radical-polymerization in the state of emulsion, the polymerization conversion drops rapidly when the proportion of α-methylstyrene in the monomer mixture exceeds 70% by weight, and the resulting copolymer is inferior in physical properties, particularly heat distortion temperature and tensile properties, so that no resin composition having a high heat distortion temperature can be obtained if it is mixed with ABS resin. Said inferiority in properties is probably due to the low polymerization conversion and the action as a plasticizer of the monomers remaining unreacted in the copolymer.

In order to overcome such disadvantages, various studies have been conducted. For example, in Japanese Pat. No. 33,661/70 there was proposed a process for producing, with a high polymerization conversion, a copolymer having a high α-methylstyrene content and a high heat distortion temperature by completing the copolymerization of α-methylstyrene and acrylonitrile in the first step and then adding a small quantity of a monovinyl aromatic compound or a vinyl cyanide compound or a mixture thereof and copolymerizing the same along with the residual α-methylstyrene monomer of the copolymerization of the first step. It is described that the thermoplastic resin obtained by said process has a higher heat distortion temperature than similar resins obtained by conventional processes. However, even said resin is still insufficient in heat resistance, particularly in dimensional stability in a high temperature atmosphere which is considered to be very important as an index for the heat resistance of thermoplastic resins currently employed in automobile parts or the like.

On the other hand, a copolymer of α-methylstyrene and methyl methacrylate has a much better heat resistance than the above-mentioned α-methylstyrene-acrylonitrile copolymer, which is proposed in Japanese Pat. No. 9,856/65. However, this copolymer is quite disadvantageous industrially in that the polymerization requires several days. In addition, it undergoes depolymerization at high temperatures and is low in heat stability, so that it is not suitable for use as a molding material. An attempt has been made to overcome this disadvantage by adding acrylonitrile as a third vinyl monomer to the emulsion copolymerization system of α-methylstyrene and methyl methacrylate to improve the polymerizability and polymerization conversion. A fairly high polymerization conversion can be reached by adding acrylonitrile to α-methylstyrene and methyl methacrylate. However, with an increase of amount of the acrylonitrile added, the heat resistance is markedly decreased even though the heat stability is improved. Accordingly, how to increase the polymerization conversion with acrylonitrile in an amount as small as possible preventing the heat resistance from decreasing has been a problem in the production of this terpolymer.

The present inventors have conducted extensive studies with the aim of overcoming the disadvantage of the conventional processes that the production yield (polymerization conversion) of α-methylstyrenemethyl methacrylate-acrylonitrile terpolymer and the heat resistance of the terpolymer cannot be satisfied simultaneously. As a result, it has been found that when a monomer mixture of α-methylstyrene, methyl methacrylate and acrylonitrile is copolymerized in two steps in which the monomer composition ratios are different, the heat resistance and the production yield can be enhanced simultaneously, the recovery operation of monomers can be simplified and an advantageous industrial production can be made possible.

It is an object of this invention to provide a thermoplastic α-methylstyrene-methyl methacrylate-acrylonitrile terpolymer resin having a high heat resistance and a process for producing said resin.

It is another object of this invention to provide a process for producing said thermoplastic resin at a high polymerization conversion.

It is still another object of this invention to provide a process for producing said terpolymer resin which contains acrylonitrile at a nearly uniform composition and has a high heat stability.

Other objects and advantages of this invention will become apparent from the following description.

According to this invention, there is provided a process for producing a thermoplastic terpolymer resin by emulsion polymerization of a monomer mixture consisting of α-methylstyrene, methyl methacrylate and acrylonitrile, characterized in that the polymerization is carried out in two steps, in the first step of which a monomer mixture consisting of 60–85% by weight of α-methylstyrene, 2–30% by weight of methyl methacrylate and 5–20% by weight of acrylonitrile is used in an amount of 30–95% by weight based on the total amount of monomers necessary for the final terpolymer, and the monomer mixture is subjected to polymerization until 25–85% by weight of a terpolymer based on the weight of the final terpolymer is formed, and in the second step of which at least one of the above-mentioned three monomers is added to the polymerization system so that the composition ratio between the three monomers in the polymerization system falls in the region surrounded by the lines (including the points on the lines) connecting point A (α-methylstyrene 60% by weight, methyl methacrylate 10% by weight, acrylonitrile 30% by weight), point B (60-methylstyrene 70% by weight, methyl methacrylate 10% by weight, acrylonitrile 20% by weight), point C (α-methylstyrene 55% by weight, methyl methacrylate 40% by weight, acrylonitrile 5% by weight), point D (α-methylstyrene 45% by weight, methyl methacrylate 50% by weight, acrylonitrile 5% by weight) and point E (α-methylstyrene 40% by weight, methyl methacrylate 50% by weight, acrylonitrile 10% by weight) in the triangular coordinate graph indicating the quantitative relationship of the three monomers, provided that said composition ratio differs from that in the first step, and the polymerization system thus obtained is subjected to polymerization conditions to complete the polymerization.

The characteristic feature of this invention consists in that the polymerization is carried out in two steps. If the polymerization in the first step is started with such a monomer composition that α-methylstyrene is in a high proportion and methyl methacrylate is contained in a relatively large amount, a terpolymer quite excellent in heat resistance can be obtained though a high conversion is difficult to achieve. For this reason, in the first step of this invention, such a terpolymer is produced in a specified amount, and then, in the second step, at least one necessary monomer of the three monomers is added to the polymerization system so that the proportion of the total of acrylonitrile and methyl methacrylate in the monomer mixture formed in the polymerization system in the second step may be larger than that in the first step, after which the polymerization is continued, aiming at improving the polymerization conversion. For this purpose, conditions are selected so that the composition ratios of the monomer mixtures in the first and second steps and the amount of the terpolymer formed in the first step may be allowed to fall in the specified regions. According to the process of this invention mentioned above, the polymer yield can be made as high as 95% or more and, in addition, the heat resistance can be improved remarkably without adversely affecting other properties such as processability, resistance to discoloration, etc.

This invention will be explained in more detail, referring to the accompanying drawing which shows a triangular coordinate graph indicating the composition of the monomer mixture to be formed in the polymerization system in the second step of the process of this invention.

In the process of this invention, the amount of α-methylstyrene in the α-methylstyrene-methyl methacrylate-acrylonitrile monomer mixture to be polymerized in the first step is in the range of 60–85% by weight. If it is less than 60% by weight, the final polymer lacks dimensional stability in a high temperature atmosphere. If it exceeds 85% by weight, its mechanical properties such as tensile properties become unsatisfactory. Preferably, the amount of α-methylstyrene is in the range of 65–80% by weight.

A larger amount of methyl methacrylate is desirable because the larger the amount, the higher the velocity of polymerization. However, in this case, the polymerization system becomes more unstable. Therefore, it is preferably 30% by weight or less from the viewpoint of operating the polymerization. If it is less than 2% by weight, the dimensional stability in a high temperature atmosphere decreases. Therefore, it is preferably in the range of 10–30% by weight from the viewpoint of enhancing the heat resistance.

Though a smaller amount of acrylonitrile imparts a better dimensional stability in a high temperature atmosphere to the resin formed, the heat stability becomes unsatisfactory. If acrylonitrile is used in too large an amount, the dimensional stability in a high temperature atmosphere becomes unsatisfactory. Therefore, the amount of acrylonitrile is preferably in the range of 5–20% by weight and more preferably 5–15% by weight. Though the desired amount of acrylonitrile may be added at once, it is more preferable that 0–70%, preferably 20–60%, by weight of the desired amount of acrylonitrile is charged into the polymerization reactor simultaneously with the other monomers and its residual 100–30%, preferably 80–40%, by weight is thereafter continuously or intermittently added to the polymerization system. If the amount of acrylonitrile added in the early stage of the first step polymerization exceeds 70% by weight, there is a tendency that the polymer formed in the early stage has too high a content of acrylonitrile and it follows that the polymer formed in the later stage of the first step polymerization has too small a content of acrylonitrile.

That is, in the terpolymerization of α-methylstyrene, methyl methacrylate and acrylonitrile, acrylonitrile is highest in polymerization velocity among the monomers. Particularly when the composition ratio of acrylonitrile is low, the content of acrylonitrile in the polymerization system becomes extremely small with the progress of polymerization reaction. When the content of acrylonitrile becomes small, the polymerization slows down and, in addition, an α-methylstyrene-α-methylstyrene sequence is formed or a long chain of α-methylstyrene-methyl methacrylate sequence is formed, both being poor in heat stability. It is preferable, therefore, to control the proportion of acrylonitrile in the unreacted monomers in the reaction system by adding the acrylonitrile continuously or intermittently. Though it is more preferable to add acrylonitrile continuously, the acrylonitrile may be intermittently added in 2–10 portions.

The monomer mixture having the composition mentioned above is polymerized until a terpolymer is formed in an amount corresponding to 25–85% by weight, preferably 40–75% by weight, of the weight of the final terpolymer, after which the necessary monomer or monomers selected from α-methylstyrene, methyl methacrylate and acrylonitrile are added so that the monomer composition ratio in the system may fall in the region surrounded by the lines connecting points A, B, C, D and E shown in the accompanying drawing, taking into consideration the composition of the monomers remaining unreacted in the first step polymerization system. In this case, the amounts of the monomers added are adjusted so that the composition ratio of monomers becomes different from that in the first step. The polymerization system thus obtained is subjected to the polymerization conditions to complete the polymerization.

It should be noted here that the resulting resin cannot have a good dimensional stability in a high temperature atmosphere unless the amount of terpolymer formed in the first step polymerization is 25% by weight or more based on the weight of the final terpolymer. If the amount of the terpolymer formed in the first step exceeds 85% by weight based on the weight of the final terpolymer, the amount of monomer or monomers added in the second step polymerization becomes so small that the reaction slows down, so that the overall polymerization conversion is difficult to enhance. In order to form the terpolymer of the first step in an amount of 25–85% by weight, preferably 40–75% by weight, based on the weight of the final terpolymer, it is necessary to use 30–95 parts by weight, preferably 50–90 parts by weight, of the monomer mixture in the first step assuming that the total amount of the monomer mixture necessary for forming the final terpolymer is 100 parts by weight.

If the amount of methyl methacrylate in the monomer mixture copolymerized in the second step is less than 10% by weight, the resulting polymer becomes poor in dimensional stability in a high temperature atmosphere.

If it exceeds 50% by weight, the latex during the polymerization becomes poor in mechanical stability, so that troubles, such as occurrence of coagulation, are caused during the polymerization. Therefore it is preferably in the range of 10-30% by weight. In order to achieve a high polymerization conversion, it is preferable that the monomer mixture to be polymerized in the second step has such a composition ratio that a large quantity of acrylonitrile is contained in the mixture. However, if the amount of acrylonitrile is too large, the resulting terpolymer is colored and, in addition, its dimensional stability in a high temperature atmosphere is probably decreased owing to the formation of polyacrylonitrile chain in the terpolymer. If the content of acrylonitrile in the monomer mixture is too low, the overall polymerization conversion is low. For these reasons, the composition ratio of monomer mixture in the second step should be in the region surrounded by the lines (including the points on the lines) connecting points A, B, C, D and E shown in the accompanying drawing.

The polymerization for producing the heat-resistant thermoplastic resin of this invention may be allowed to proceed in the conventional emulsion polymerization manner. The emulsifiers usable in the polymerization include anionic surfactants such as sodium salts and potassium salts of higher fatty acids, for example, lauric acid, oleic acid, stearic acid and the like; alkali metal salts of alkylbenzenesulfonic acids; alkali metal salts of esters of sulfuric acid with higher alcohols; potassium salt of disproportionated rosin acid; and the like. They may be used either alone or in admixture of two or more. As the polymerization catalyst, persulfates and redox catalysts which are combinations of organic peroxides with reducing agents, such as sulfoxylate formulation, sugar-containing pyrophosphate formulation or the like, may be used. Among them, as the redox catalysts, the combinations of organic peroxides such as p-menthane hydroperoxide, cumene hydroperoxide, diisopropylbenzene peroxide and the like with sulfoxylate formulation comprising sodium formaldehydesulfoxylate, sodium ethylenediaminetetraacetate and ferrous sulfate are preferable because of high polymerization velocity. In addition, additives which are used in the conventional emulsion polymerization such as polymerization promotor, polymerization stabilizer, molecular weight regulator and the like, may be used.

In each of the first and second steps, the polymerization is usually carried out at normal pressure or under pressure of not more than 2 kg/cm²G, at a temperature of 40°-90° C., over a period of 2-12 hours. When a part of the acrylonitrile is continuously or intermittently added in the first step polymerization, it is recommended to add it over a period of 1-8 hours.

It is not objectionable to add compounding additives such as antioxidant, lubricant, colorant and the like to the resin obtained according to this invention. It is also possible to blend the resin obtained according to this invention with a thermoplastic resin obtained by grafting on a rubbery polymer, such as polybutadiene, styrene-butadiene rubber, ethylene-propylene rubber, and the like at least one monomer selected from the group consisting of styrene, acrylonitrile and methyl methacrylate, in order to reinforce the impact resistance of the resin of the invention.

This invention will be explained below specifically referring to Examples. In the Examples, all the parts and percentages are by weight unless otherwise specified. The amount of monomers remaining at the end of the first step polymerization was determined from preliminary experiments wherein polymerization was carried out at each composition. The quantities of residual monomers at various polymerization conversions were determined by gas chromatography. The values of residual monomer given in the examples were deduced from the percent conversions using the data of the preliminary experiments.

EXAMPLE 1

200 Parts of deionized water and 3 parts of potassium stearate were introduced into a reactor purged with nitrogen, and 52.5 parts (75%) of α-methylstyrene, 14.0 parts (20%) of methyl methacrylate and 3.5 parts (5%) of acrylonitrile as a monomer mixture in the first step and 0.1 parts of tertiary dodecylmercaptan were added to the reactor and formed into an emulsion. The temperature was raised to 50° C. while stirring the mixture under a nitrogen atmosphere, after which a solution of 0.4 part of sodium formaldehydesulfoxylate, 0.2 part of sodium ethylenediaminetetraacetate and 0.01 part of ferrous sulfate in 10 parts of deionized water was added and then 0.15 part of cumene hydroperoxide was added to start the polymerization reaction. The polymerization was continued while controlling the jacket temperature of the reactor at 60° C. When the conversion of the monomer mixture had reached 60%, the composition of the residual monomer was as follows: α-methylstyrene 25.9 parts, methyl methacrylate 2.1 parts, acrylonitrile 0 part. Then, 8.9 parts of α-methylstyrene, 9.5 parts of methyl methacrylate and 11.6 parts of acrylonitrile were added. The resulting monomer mixture in the polymerization system, namely the newly added monomers plus the monomers remaining unreacted in the first step polymerization, had a composition ratio indicated by point (a) in the accompanying drawing. The mixture having this composition ratio acted as the monomer mixture of the second step. Then, 0.1 part of tertiary dodecylmercaptan and 0.15 part of cumene hydroperoxide were added and the polymerization reaction was continued for 2 hours. The overall polymerization conversion was 97%. The terpolymer latex thus obtained was coagulated with calcium chloride and held at a temperature of 90° C. or higher for 10-20 minutes with stirring, after which it was separated, washed with water and dried to obtain a resin powder.

An antioxidant was added to this resin powder, and the mixture was pelletized by means of a vent type extruder while removing the unreacted monomers. The desired test pieces were prepared therefrom by injection molding. The Vicat softening temperature measured according to ASTM D 1525 at a rate of temperature rise of 50°±5° C./hr was 146° C. The 1%-heat shrinkage temperature determined according to the following method was 139° C.

Measurement of 1%-heat shrinkage temperature

A $\frac{1}{8}''\times\frac{1}{2}''\times 5''$ test piece was prepared by injection molding, and the length of its longest part ($L_0$) was measured. It was placed in a Geer oven for one hour and then taken out and allowed to stand at room temperature for one hour, after which the length of the longest part ($L_1$) was again measured. As the temperature of the Geer oven, several temperatures were selected at intervals of 5° C. $L_1$ was measured at every temperature, and the temperature at which the heat shrinkage (α) which could be calculated according to the following equation corresponds to 1% was determined:

$$\alpha = (L_0 - L_1)/L_0 \times 100 \ (\%)$$

EXAMPLES 2 to 11

Polymerization was carried out by repeating the procedure of Example 1, except that the monomer composition ratios in the first and second steps were varied or both the monomer composition ratios and the amounts of monomers added were varied as shown in Table 1. The resin powders obtained were treated in the same manner as in Example 1 and their Vicat softening temperatures and 1%-heat shrinkage temperatures were measured. As is apparent from the details in Table 1, the overall polymerization conversion was as high as 95% or more, and the Vicat softening temperature was 140° C. or higher and the 1%-heat shrinkage temperature was 135° C. or higher, demonstrating the excellent heat resistance of the products.

EXAMPLE 12

The reaction was carried out by the same procedure as in Example 1, provided that the compositions of monomer mixture in the first and second steps were the same as in Example 3 and the total amount of monomers in the first step and the amount of monomers added in the second step were 35 parts and 65 parts, respectively. The overall polymerization conversion was so high as 96% and a resin having a Vicat softening temperature of 141° C. and a 1%-heat shrinkage temperature of 132° C. was obtained.

COMPARATIVE EXAMPLE 1

In Example 4, when the polymerization conversion in the first step had reached 30%, the composition of the residual monomers was as follows: α-methylstyrene 34.3 parts, methyl methacrylate 13.3 parts, and acrylonitrile 1.4 parts. At this point, 9.2 parts of α-methylstyrene, 10.4 parts of methyl methacrylate and 10.4 parts of acrylonitrile were added so that the monomer composition ratio in the second step came to point (g) in the accompanying drawing. At this composition ratio, the polymerization was carried out, to obtain a resin having a Vicat softening temperature of 138° C. and a 1%-heat shrinkage temperature of 130° C. with an overall polymerization conversion of 96%. The content of the polymer formed in the first step in this resin was calculated as 22%.

COMPARATIVE EXAMPLES 2 and 3

In Example 4, when the polymerization conversion in the first step had reached 70%, the necessary quantities of monomers were added so that the monomer composition ratio in the second step came to point (h) and point (i) in the accompanying drawing. The resins of Comparative Examples 2 and 3 thus obtained had lower Vicat softening temperatures and 1%-heat shrinkage temperatures than the resin of this invention, and colored yellowish brown.

COMPARATIVE EXAMPLES 4 to 13

200 Parts of deionized water, 3 parts of potassium stearate, 61.4 parts of α-methylstyrene, 23.5 parts of methyl methacrylate, 15.1 parts of acrylonitrile these quantities of monomers were equal to the total quantities of monomer mixture used in the first and second steps of Example 1) and 0.2 part of tertiary dodecylmercaptan were introduced into a reactor purged with nitrogen and formed into an emulsion. The temperature was raised to 50° C. while stirring the mixture under a nitrogen atmosphere, after which a solution of 0.4 part of sodium formaldehydesulfoxylate, 0.2 part of sodium ethylenediaminetetraacetate and 0.01 part of ferrous sulfate in 10 parts of deionized water was added and then 0.3 part of cumene hydroperoxide was added to start the polymerization reaction. The polymerization was continued for 4 hours while controlling the jacket temperature of the reactor at 60° C., upon which the polymerization conversion reached 92%. The terpolymer latex was treated in the same manner as in Example 1. The Vicat softening temperature and 1%-heat shrinkage temperature of the resin were found to be 140° C. and 130° C., respectively.

The same quantities of monomers as the total quantities of monomers used in the first and second steps of Examples 2 to 10 were used and the polymerization was carried out in the same manner as in Comparative Example 4. The results are shown in Table 2 as Comparative Examples 5 to 13. As compared with the Examples of this invention, such processes that the monomers were at once added and polymerized gave a lower polymerization conversion and a resin having a lower Vicat softening temperature and 1%-heat shrinkage temperature.

TABLE 1

| | | Amounts of monomers added in the 1st step (parts)* | | | Total amount of monomers added in the 1st step (parts) | Polymerization conversion in the 1st step (%) | Proportion of polymer formed in the 1st step (%) | Amounts of monomers added in the 2nd step (parts)** | | | Monomer composition ratio in the system in the 2nd step (points in the accompanying drawing) | Overall polymerization conversion (%) | Vicat softening temp. (°C.) | 1%-Heat shrinkage temp. (°C.) |
|---|---|---|---|---|---|---|---|---|---|---|---|---|---|---|
| | | α-MS | MMA | AN | | | | α-MS | MMA | AN | | | | |
| Example | 1 | 52.5 (75%) | 14.0 (20%) | 3.5 (5%) | 70 | 60 | 43 | 8.9 (60%) | 9.5 (20%) | 11.6 (20%) | (a) | 97 | 146 | 139 |
| Example | 2 | 52.5 (75%) | 14.0 (20%) | 3.5 (5%) | 70 | 60 | 43 | 6.0 (55%) | 15.3 (30%) | 8.7 (15%) | (g) | 98 | 143 | 138 |
| Example | 3 | 55.25 (65%) | 25.5 (30%) | 4.25 (5%) | 85 | 70 | 63 | 1.0 (55%) | 8.0 (30%) | 6.0 (15%) | (g) | 95 | 147 | 140 |
| Example | 4 | 45.5 (65%) | 21.0 (30%) | 3.5 (5%) | 70 | 70 | 51 | 10.6 (55%) | 11.8 (30%) | 7.6 (15%) | (g) | 97 | 146 | 138 |
| Example | 5 | 32.5 (65%) | 15.0 (30%) | 2.5 (5%) | 50 | 70 | 36 | 23.3 (55%) | 17.0 (30%) | 9.7 (15%) | (g) | 98 | 142 | 136 |
| Example | 6 | 45.5 (65%) | 21.0 (30%) | 3.5 (5%) | 70 | 70 | 51 | 8.0 (50%) | 16.9 (40%) | 5.1 (10%) | (b) | 96 | 148 | 140 |
| Example | 7 | 45.5 (65%) | 21.0 (30%) | 3.5 (5%) | 70 | 70 | 51 | 10.6 (55%) | 6.7 (20%) | 12.7 (25%) | (j) | 96 | 143 | 137 |
| Example | 8 | 49.0 (70%) | 14.0 (20%) | 7.0 (10%) | 70 | 70 | 51 | 11.0 (60%) | 8.8 (20%) | 10.2 (20%) | (a) | 96 | 143 | 138 |
| Example | 9 | 49.0 (70%) | 14.0 (20%) | 7.0 (10%) | 70 | 70 | 51 | 3.4 (45%) | 19.0 (40%) | 7.6 (15%) | (k) | 97 | 141 | 137 |
| Example | 10 | 49.0 (70%) | 10.5 (15%) | 10.5 (15%) | 70 | 80 | 57 | 13.8 (60%) | 8.8 (20%) | 7.4 (20%) | (a) | 98 | 140 | 135 |
| Example | 11 | 58.0 (72.5%) | 12.0 (15%) | 10.0 (12.5%) | 80 | 72 | 59 | 5.7 (60%) | 5.8 (20%) | 8.5 (20%) | (g) | 97 | 142 | 135 |
| Example | 12 | 22.75 (65%) | 10.5 (30%) | 1.75 (5%) | 35 | 70 | 26 | 32.8 (55%) | 21.0 (30%) | 11.2 (15%) | (g) | 96 | 141 | 132 |
| Comparative Example | 1 | 45.5 (65%) | 21.0 (30%) | 3.5 (5%) | 70 | 30 | 22 | 9.2 (55%) | 10.4 (30%) | 10.4 (15%) | (h) | 96 | 138 | 130 |
| Comparative Example | 2 | 45.5 (65%) | 21.0 (30%) | 3.5 (5%) | 70 | 70 | 52 | 5.5 (45%) | 6.7 (20%) | 17.8 (35%) | (i) | 94 | 136 | 130 |
| Comparative Example | 3 | 45.5 (65%) | 21.0 (30%) | 3.5 (5%) | 70 | 70 | 52 | 0.4 (35%) | 16.9 (40%) | 12.7 (25%) | — | 95 | 138 | 132 |

*: The figures in the parentheses denote monomer composition ratio in the 1st step.
**: The figures in the parentheses denote monomer composition ratio in the system of the 2nd step.
α-MS: α-Methylstyrene
MMA: Methyl methacrylate
AN: Acrylonitrile Proportion of polymer formed in the 1st step (%) = $\dfrac{\text{Conversion in monomers in the 1st step} \times \text{the 1st step}}{\text{Overall polymerization conversion (\%)}}$

TABLE 2

Comparative Examples in which all monomers were added at once

| | | Amounts of monomers added (parts) | | | Polymerization conversion (%) | Vicat softening temp. (°C.) | 1%-Heat shrinkage temp. (°C.) | Examples to which the monomer compositions correspond |
|---|---|---|---|---|---|---|---|---|
| | | α-MS | MMA | AN | | | | |
| Comparative Example | 4 | 61.4 | 23.5 | 15.1 | 92 | 140 | 130 | Example 1 |
| Comparative Example | 5 | 58.5 | 29.3 | 12.2 | 92 | 139 | 129 | Example 2 |
| Comparative Example | 6 | 56.25 | 33.5 | 10.25 | 94 | 142 | 131 | Example 3 |
| Comparative Example | 7 | 56.1 | 32.8 | 11.1 | 93 | 141 | 130 | Example 4 |
| Comparative Example | 8 | 55.8 | 32.0 | 12.2 | 92 | 140 | 128 | Example 5 |
| Comparative Example | 9 | 53.5 | 37.9 | 8.6 | 90 | 144 | 132 | Example 6 |
| Comparative Example | 10 | 56.1 | 27.7 | 16.2 | 95 | 138 | 128 | Example 7 |
| Comparative Example | 11 | 60.0 | 22.8 | 17.2 | 93 | 137 | 126 | Example 8 |
| Comparative Example | 12 | 52.4 | 33.0 | 14.6 | 94 | 139 | 128 | Example 9 |
| Comparative Example | 13 | 62.8 | 19.3 | 17.9 | 95 | 137 | 127 | Example 10 |

Note:
α-MS: α-Methylstyrene
MMA: Methyl methacrylate
AN: Acrylonitrile

EXAMPLE 13

184 Parts of deionized water, 2.4 parts of potassium stearate, 58 parts of α-methylstyrene, 12 parts of methyl methacrylate, 5 parts of acrylonitrile and 0.25 part of tertiary dodecylmercaptan were charged into a reactor equipped with a stirrer and purged with nitrogen, and formed into an emulsion. The temperature was raised to 40° C. while stirring the mixture under a nitrogen atmosphere, after which a solution of 0.16 part of sodium formaldehydesulfoxylate, 0.08 part of sodium ethylenediaminetetraacetate and 0.003 part of ferrous sulfate in 16 parts of deionized water was added and then 0.25 part of cumene hydroperoxide was added to start the polymerization reaction. After the polymerization had been carried out for one hour while controlling the jacket temperature of the reactor at 60° C., 5 parts of acrylonitrile was continuously added over a period of 2 hours and then the polymerization was continued for an additional one hour. At this point, the polymerization conversion was 75% and the residual monomers were 17.6 parts of α-methylstyrene, 2.0 parts of methyl methacrylate and 0.4 part of acrylonitrile. On the other hand, in another vessel, 6.4 parts of α-methylstyrene, 6.0 parts of methyl methacrylate, 7.6 parts of acrylonitrile and 0.15 part of tertiary dodecylmercaptan were added to 46 parts of deionized water and 0.6 part of potassium stearate and the mixture was formed into an emulsion. This emulsion was added to the aforementioned reactor (the thus added monomers were combined with the residual monomers in the first step to form a mixture having the monomer composition ratio corresponding to point (a) in the accompanying drawing, and they were used as the monomer mixture for the second step). Then, a solution of 0.04 part of sodium formaldehydesulfoxylate, 0.02 part of sodium ethylenediaminetetraacetate and 0.002 part of ferrous sulfate in 4 parts of deionized water was added and thereafter 0.05 part of cumene hydroperoxide was added, after which polymerization was continued for 2 hours, upon which the overall polymerization conversion reached 97%.

The terpolymer latex thus obtained was coagulated with calcium chloride, separated, washed with water and dried to obtain a resin powder.

An antioxidant was added to this resin powder, and the mixture was pelletized by means of a vent type extruder while removing the unreacted monomers. The desired test pieces were prepared therefrom by means of an injection machine, and the 1%-heat shrinkage temperature was determined according to the method mentioned in Example 1. The result was 132° C. As an index for heat stability, a test piece was prepared by retaining the resin in the injection machine at 280° C. for 15 minutes and then injection-molding it. A visual test detected no drop in gloss nor occurrence of surface defect, and the result was very good.

EXAMPLES 14 to 18

Polymerization was carried out by repeating the procedure of Example 13, except that the composition ratio of initially added monomers and the ratio of continuously added acrylonitrile were varied as shown in Table 3 or, in addition thereto, the amounts of monomers added in the first and second steps were varied as shown in Table 3. The resin powder obtained was treated in the same manner as in Example 13 and tested for 1%-heat shrinkage temperature and heat stability.

As a result, the effect of this invention could be confirmed sufficiently, although the product of Example 15 wherein the amount of acrylonitrile continuously added in the first step polymerization was small and the product of Example 18 wherein the proportion of acrylonitrile in the first step polymerization was low were somewhat inferior in heat stability to the product of Example 13.

EXAMPLES 19 to 21

Polymerization was carried out by repeating the procedure of Example 13, except that the monomer composition ratio in the second step was varied. The resin powder obtained was treated in the same manner as in Example 13 and tested for 1%-heat shrinkage temperature and heat stability. As shown in Table 3, resins which were excellent in 1%-heat shrinkage temperature and had a good heat stability were obtained with a high overall polymerization conversion.

COMPARATIVE EXAMPLE 14

Polymerization was carried out by repeating the procedure of Example 13, except that the monomer composition ratio in the second step corresponded to point (e) in the accompanying drawing. The product was aftertreated in the same manner as in Example 13 and then tested for 1%-heat shrinkage temperature and heat stability. As shown in Table 3, the results were unsatisfactory in that the polymerization conversion was low and silver streaks and flash lines were noticeable in the heat stability test.

COMPARATIVE EXAMPLE 15

Polymerization was carried out by repeating the procedure of Example 13, except that the monomer composition ratio in the second step corresponded to point (f) in the accompanying drawing. The product was aftertreated in the same manner as in Example 13 and then tested for 1%-heat shrinkage temperature and heat stability. The test piece used in the heat stability test was colored yellow, and no resin of good heat stability could be obtained.

COMPARATIVE EXAMPLE 16

64.4 Parts of α-methylstyrene, 18 parts of methyl methacrylate, 17.6 parts of acrylonitrile and 0.4 part of tertiary dodecylmercaptan were added to 230 parts of deionized water and 3.0 parts of potassium stearate. The mixture was charged into a reactor equipped with a stirrer purged with nitrogen and formed into an emulsion. At this point, the monomer composition ratio of the mixture was equal to the composition ratio of the total monomers used in the first and second steps in Example 13. The temperature was raised to 40° C. while stirring the mixture under a nitrogen atmosphere after which a solution of 0.2 part of sodium formaldehydesulfoxylate, 0.1 part of sodium ethylenediaminetetraacetate and 0.005 part of ferrous sulfate in 20 parts of deionized water was added and thereafter 0.3 part of cumene hydroperoxide was added to start the polymerization reaction. The reaction was continued for 5 hours while controlling the jacket temperature of the reactor at 60° C., and the polymerization conversion was found to be 94%.

The terpolymer latex thus obtained was aftertreated in the same manner as in Example 13 and then tested for 1%-heat shrinkage temperature and heat stability. As shown in Table 3, the 1%-heat shrinkage temperature was 125° C. The heat stability was unsatisfactory in that occurrence of many silver streaks and flash lines was observed.

TABLE 3

| | Monomer composition ratio in the 1st step (%) | | | | | 1st step | | Amounts of monomers added in the 2nd step** (parts) | | | Monomer composition ratio in the system in the 2nd step (points in the accompanying drawing) | Overall polymerization conversion (%) | 1%-Heat shrinkage temp. (°C.) | Heat stability in molding (visual test)*** |
|---|---|---|---|---|---|---|---|---|---|---|---|---|---|---|
| | Addition in the early stage | | | Continuous addition | | Total amount of monomers added (parts) | Polymerization conversion (%) | Proportion of polymer (%)* | α-MS | MMA | AN | | | | |
| | α-MS | MMA | AN | | AN | | | | | | | | | | |
| Example 13 | 72.5 | 15 | 6.25 | | 6.25 | 80 | 75 | 62 | 6.4 (60%) | 6.0 (20%) | 7.6 (20%) | (a) | 97 | 132 | A |
| Example 14 | 72.5 | 15 | 3.75 | | 8.75 | 80 | 76 | 63 | 7.2 | 6.0 | 6.8 | (a) | 97 | 133 | A |
| Example 15 | 72.5 | 15 | 8.75 | | 3.75 | 80 | 73 | 60 | 6.1 | 5.9 | 8.0 | (a) | 97 | 132 | B |
| Example 16 | 80 | 10 | 5 | | 5 | 80 | 62 | 51 | 1.6 | 8.6 | 9.8 | (a) | 96 | 131 | A |
| Example 17 | 77 | 5 | 9 | | 9 | 80 | 90 | 75 | 9.6 | 5.6 | 4.8 | (a) | 97 | 128 | A |
| Example 18 | 65 | 25 | 5 | | 5 | 70 | 70 | 51 | 14.1 | 6.3 | 9.6 | (a) | 96 | 130 | B |
| Example 19 | 72.5 | 15 | 6.25 | | 6.25 | 80 | 75 | 63 | 2.4 | 14.0 | 3.6 | (b) | 95 | 134 | A |
| Example 20 | 72.5 | 15 | 6.25 | | 6.25 | 80 | 75 | 62 | 8.4 (50%) (65%) | 2.0 (40%) (10%) | 9.6 (10%) (25%) | (c) | 97 | 128 | A |
| Example 21 | 72.5 | 15 | 6.25 | | 6.25 | 80 | 75 | 62 | 2.4 (50%) | 10.0 (30%) | 7.6 (20%) | (d) | 97 | 131 | A |
| Comparative Example 14 | 72.5 | 15 | 6.25 | | 6.25 | 80 | 75 | 67 | 9.4 (67.5%) | 6.0 (20%) | 4.6 (12.5%) | (e) | 90 | 130 | D |
| Comparative Example 15 | 72.5 | 15 | 6.25 | | 6.25 | 80 | 75 | 64 | 2.4 (50%) | 6.0 (20%) | 11.6 (30%) | (f) | 94 | 128 | C |
| Comparative Example 16 | 64.4 | 18 | 17.6 | | — | — | — | — | — | — | — | — | 94 | 125 | D |

Note:
α-MS: α-Methylstyrene;
MMA: Methyl methacrylate;
AN: Acrylonitrile
*Proportion of polymer is as defined in the footnote of Table 1.
**The figures in the parentheses denote monomer composition ratio in the system.
***A: Surface of test piece is excellent.
B: Surface of test piece is cloudy but "unsatisfactory" state is not observed on the surface.
C: Surface of test piece exhibits somewhat "unsatisfactory" state.
D: The whole surface of test piece exhibits "unsatisfactory" state.

What is claimed is:

1. A process for producing a thermoplastic terpolymer resin by emulsion polymerization of a monomer mixture consisting of α-methylstyrene, methyl methacrylate and acrylonitrile, characterized in that the polymerization is carried out in two steps, in the first step of which a monomer mixture consisting of 60-85% by weight of α-methylstyrene, 2-30% by weight of methyl methacrylate and 5-20% by weight of acrylonitrile is used in an amount of 30-95% by weight based on the amount of the monomers necessary for the final terpolymer and subjected to polymerization until 25-85% by weight of a terpolymer based on the weight of the final terpolymer is formed, and in the second step of which at least one of the above-mentioned three monomers is added to the polymerization system so that the composition ratio between the three monomers present in the polymerization system falls in the region surrounded by the lines (including the points on the lines) connecting point A (α-methylstyrene 60% by weight, methyl methacrylate 10% by weight, acrylonitrile 30% by weight), point B (α-methylstyrene 70% by weight, methyl methacrylate 10% by weight, acrylonitrile 20% by weight), point C (α-methylstyrene 55% by weight, methyl methacrylate 40% by weight, acrylonitrile 5% by weight), point D (α-methylstyrene 45% by weight, methyl methacrylate 50% by weight, acrylonitrile 5% by weight) and point E (α-methylstyrene 40% by weight, methyl methacrylate 50% by weight, acrylonitrile 10% by weight) in the triangular coordinate graph indicating the quantitative relationship of the three monomers, provided that said composition ratio differs from that in the first step, and the polymerization system thus obtained is subjected to polymerization conditions to complete the polymerization..

2. A process according to claim 1, wherein in the first step polymerization, 30-100% by weight of the amount of acrylonitrile used in the first step is added either continuously or intermittently.

3. A process according to claim 1, wherein in the first step polymerization, 40-80% by weight of the amount of acrylonitrile used in the first step is added either continuously or intermittently.

4. A process according to claim 1, wherein the monomer mixture added in the first step polymerization consists of 65-80% by weight of α-methylstyrene, 10-30% by weight of methyl methacrylate and 5-20% by weight of acrylonitrile.

5. A process according to claim 1, wherein the monomer mixture added in the first step polymerization consists of 65-80% by weight of α-methylstyrene, 10-30% by weight of methyl methacrylate and 5-15% by weight of acrylonitrile.

6. A process according to claim 5, wherein the first step polymerization is carried out until a terpolymer is formed in an amount of 25-75% by weight based on the weight of the final terpolymer.

7. A process according to claim 1 or 2, wherein the first step polymerization is carried out until a terpolymer is formed in an amount of 40-75% by weight based on the weight of the final terpolymer.

8. A process according to claim 6, wherein the monomer mixture added in the first step polymerization comprises 65-75% by weight of α-methylstyrene, 15-30% by weight of methyl methacrylate and 5-15% by weight of acrylonitrile.

9. A process according to claim 1, wherein the monomer mixture existing in the polymerization system in the second step contains 10-30% by weight of methyl methacrylate.

10. A process according to claim 1 or 2, wherein in each of the first and second steps the polymerization is carried out at 40° C. to 90° C. for 2 to 12 hours.

11. A process according to claim 2, wherein in the first step 30-100% by weight of the acrylonitrile is continuously added over a period of 1 to 8 hours.

12. A process according to claim 2, wherein in the first step 30-100% by weight of the acrylonitrile is intermittently added in 2 to 10 portions.

13. A thermoplastic terpolymer resin obtained by the process of claim 1.

14. A thermoplastic terpolymer resin obtained by the process of claim 2.

* * * * *